United States Patent [19]

Park

[11] Patent Number: 5,142,281
[45] Date of Patent: Aug. 25, 1992

[54] VEHICLE MOUNTING APPARATUS OF AN AUTOMATIC VEHICLE LOCATION SYSTEM

[75] Inventor: Hyun-Chul Park, Ahnsan, Rep. of Korea

[73] Assignee: Samsung Electronics Co., Ltd., Suwon, Rep. of Korea

[21] Appl. No.: 473,047

[22] Filed: Jan. 31, 1990

[30] Foreign Application Priority Data

May 16, 1989 [KR] Rep. of Korea .............. 1989-6524

[51] Int. Cl.$^5$ .............................................. G08G 1/123
[52] U.S. Cl. .................................. 340/991; 340/989; 342/457; 364/460
[58] Field of Search ............... 340/991, 993, 988, 989, 340/901, 904; 342/457, 450, 357; 364/460, 449; 455/99

[56] References Cited

U.S. PATENT DOCUMENTS

| | | | |
|---|---|---|---|
| 4,596,988 | 6/1986 | Wanka | 342/457 |
| 4,622,557 | 11/1986 | Westerfield | 342/357 |
| 4,700,179 | 10/1987 | Fancher | 340/572 |
| 4,742,357 | 5/1988 | Rackley | 342/457 |
| 4,783,654 | 11/1988 | Ichikawa | 340/825.44 |
| 4,818,998 | 4/1989 | Apsell et al. | 342/457 |
| 4,931,788 | 6/1990 | Creswick | 340/825.54 |

*Primary Examiner*—Jin F. Ng
*Assistant Examiner*—Brent A. Swarthout
*Attorney, Agent, or Firm*—Robert E. Bushnell

[57] ABSTRACT

A vehicle mounting apparatus for an automatic vehicle location system having a omni-directional antenna, a transmitting and receiving switch, an oscillator frequency converters, a frequency-shift keying demodulator, post office committe standard associate group decoder, a pseudorandom noise signal generator, a phase-shift keying modulator, a transmitting signal generator, a power amplifier, and a power supplier. The vehicle mounting apparatus receives a referencing signal from a control center and transmits an answer signal relating to location of a vehicle to be located.

19 Claims, 2 Drawing Sheets

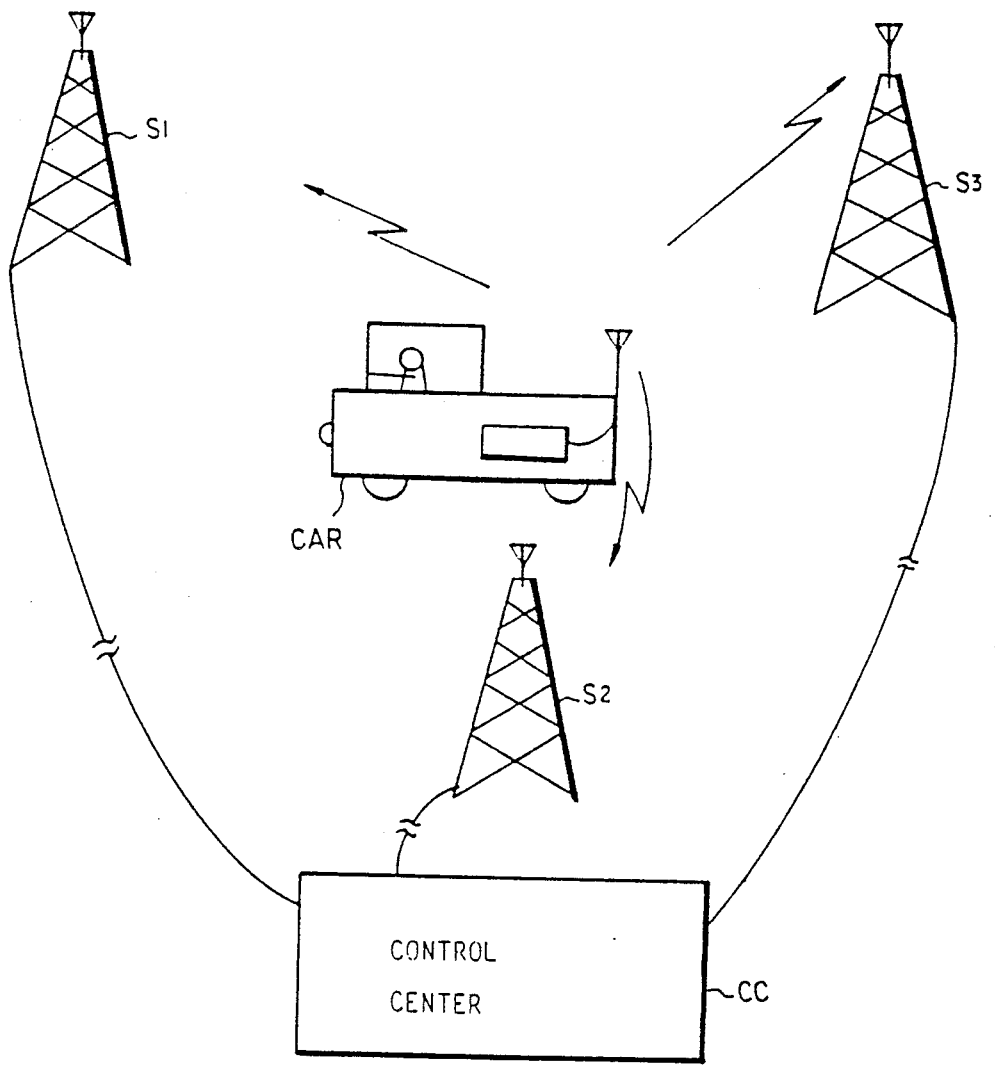
F I G. 1

VEHICLE MOUNTING APPARATUS OF AN AUTOMATIC VEHICLE LOCATION SYSTEM

BACKGROUND OF THE INVENTION

The present invention relates to an automatic vehicle location system, more particularly, to a transmitting and receiving apparatus mounted on a vehicle. Generally, the vehicle location system uses a central controller and a vehicle mounted apparatus. A global positioning system (GPS) using a satellite, and a long range navigation C(LORAN C) system using an ultra high frequency(UHF) signal represent the vehicle location system. The GPS has an advantage in that it may exactly reference a vehicle, while it has a disadvantage in that it costs a great deal and its application is limited. The LORAN C, unlike the GPS, may not exactly locate a vehicle.

SUMMARY OF THE INVENTION

The object of the present invention is to provide a vehicle mounted apparatus of an automatic vehicle location system playing a role for transmitting a vehicle location signal to a control center in response to a reference signal from the control center.

According to one aspect of the present invention, a vehicle mounted apparatus of an automatic vehicle location system includes:

a non-directional antenna;

a transmitting and receiving (T/R) switch for transmitting an answer signal to the antenna, and for receiving a signal from the antenna;

a first frequency converter for converting the received signal into a signal of a first intermediate frequency;

a frequency generator having a temperature compensated oscillator which generates a signal of a given frequency, for generating a signal of a first frequency in order to provide a first radio frequency mixer of the first frequency converter with the signal of the first frequency, and for generating a signal of a second frequency and a signal of a third frequency;

a second frequency converter for converting an output of the first frequency converter into a signal of a second intermediate frequency;

a frequency-shift keying (FSK) demodulator for encoding an output of the second frequency converter in a format of post office committee standard association group code (POCSAG code) by demodulating the output of the second frequency converter with the signal of the second intermediate frequency in the manner of frequency-shift keying demodulation;

a POCSAG decoder for producing a flag signal only when an output code of the FSK demodulator and an identifying address code of the vehicle are equal to each other;

a controller for producing a control signal in response to the flag signal, wherein said control signal is sent to the T/R switch;

a pseudo random noise (PRN) signal generator for converting the signal of the second frequency into the PRN signal under the control of the controller;

a phase shift keying modulator for modulating an output of the PRN signal with the signal of the third frequency in the manner of the PSK modulation;

an answer signal generator for generating the answer signal informing the location of the vehicle;

a transmitting signal generator for generating the transmitting signal by converting output of the answer signal generator into a signal of the first frequency; and a power amplifier, operably associated with the control signal from the controller, for amplifying the output of the transmitting signal generator.

BRIEF DESCRIPTION OF THE ATTACHED DRAWINGS

FIG. 1 illustrates an automatic vehicle location system of the present invention; and FIG. 2 is a circuit diagram for schematizing a inventive vehicle mounted apparatus of the automatic vehicle location system.

DETAILED DESCRIPTION OF THE PREFERRED EMBODIMENT

The present invention will now be described more specifically with reference to the drawings attached only by way of example.

Referring to FIG. 1, an automatic vehicle location system of the present invention includes a control center CC, a plurality of base station site antennas S1-S3 a paging antenna, and a vehicle mounted apparatus. The vehicle mounted apparatus has an identifying address code in the format of a Post Office Committee Standard Association Group(POCSAG) code. The control center CC modulates POCSAG coded address information in the manner of ,the frequency shift keying and transmits the modulated signal, that is, a referencing signal to the vehicle to be located. The referencing signal is transmitted to the receiver of the vehicle mounted apparatus by way of the antenna in the vehicle mounted apparatus, and the vehicle mounted apparatus then transmits to the site antennas an answer signal relating to the location of the vehicle to the site antennas only when the address code which is changed from the received signal is equal to the identifying address code. The answer signal is transmitted to the control center CC via the site antennas $S_1$-$S_3$, whereby the control center CC can reference the location of the vehicle.

Referring to FIG. 2, the vehicle mounted apparatus has a non-directional antenna 12, a transmitting and receiving switch (T/R switch) 14, a first frequency converter 22, a frequency generator 31, a second frequency generator 39, a frequency shift keying(FSK) demodulator 40, a POCSAG decoder 42, a controller 44, an answer signal generator 49, a phase shift keying(PSK) modulator 53, a transmitting signal generator 57, and a power amplifier 58.

The T/R switch 14 receives the referencing signal from the antenna 12, or transmits the transmitting signal to the antenna 12. The first frequency converter 22 converts a received signal from the T/R switch 14 into a signal of a first intermediate frequency (1st-IF). The frequency generator 31 having a temperature compensated oscillator, generates the signal of the first frequency, the signal of the second frequency, and the signal of the third frequency. The second frequency converter 39 converts an output of the frequency converter 22 into a signal of the second intermediate frequency (2nd-IF). The frequency shift keying (FSK) demodulator 40 demodulates an output of the second frequency converter 39 in the manner of frequency shift keying modulation in order to encode the output of the second frequency converter 39 in the format of the POCSAG code. The POCSAG decoder 42 compares the output of the FSK demodulator with the identifying address code, and produces a flag signal only when the two address codes are equal. The controller 44 produces a control signal in order to set the T/R switch to be in transmitting mode and to enable the vehicle mounted apparatus to generate an answer signal in response to the flag signal. The answer signal generator 49 converts the signal of the second frequency of the frequency generator 31 into a pseudo random noise (PRN) signal in response to the control signal of the controller 44. The PSK modulator 53 modulates the output of the answer signal generator 49 with the signal of the third frequency of the frequency generator 31 in the manner of PSK modulation. The transmitting signal generator 57 generates the transmitting signal by inputting an output of the PSK modulator 53 from band pass filter 52. The power amplifier 58 amplifies an output the transmitting signal generator 57 in order to transmit the answer signal informing the location of the vehicle to the T/R switch 14 which is enabled by the control signal from the controller 44.

The first frequency converter 22 includes a first radio frequency(RF) amplifier 16 for amplifying the received signal, a first RF band pass filter 18 for RF band-pass-filtering the output of the first RF amplifier 16, and a first RF mixer 20 for mixing the output of the first RF band pass filter 18 with the signal of the first frequency (1st-IF).

The second frequency converter 39 has a second RF band pass filter 32 for RF band-pass-filtering the output of the first frequency converter 22, a local oscillator 36 for generating the signal of the given frequency, a second RF mixer 34 for mixing an output of the second RF band pass filter 32 with the signal from the local oscillator 36 in order to produce the signal of the second intermediate frequency (2nd-IF), and a third RF band pass filter 38 for RF band pass filtering an output of the second RF mixer 34.

The frequency generator 31 includes a temperature compensated oscillator 24 for generating the signal of the given frequency (fx), a first phase-locked-loop (PLL) 26 for converting an output of the temperature compensated generator 24 into the signal of the first frequency (64fx), a frequency divider 28 for producing the signal of the second frequency (fx/9) by dividing the frequency (fx) generated from the temperature compensated oscillator 24 by nine, and a second PLL 30 for converting the output of the frequency divider 28 into the signal of the third frequency (32fx/9).

The answer signal generator 49 has a pseudo random noise (PRN) signal generator 46 for converting the signal of the second frequency (fx/9) into a PRN signal (fPRN) under the control of the controller 44, and a low pass filter(LPF) 48 for low-pass-filtering the output of the PRN signal generator 46.

The PSK modulator 53 includes a PSK modulator 50 for modulating the output of the LPF 48 with the signal of the third frequency (32fx/9) in a way of PSK modulation, and a fourth RF band pass filter 52 for RF band-pass-filtering the output of the PSK modulator 50.

The transmitting signal generator 57 has a transmitting mixer 54 for mixing an output of the RF band pass filter 52 with the signal of the first frequency (64fx) from the frequency generator 31, a fifth RF band pass filter 56 for RF band-pass-filtering the output of the transmitting mixer 54, and a radio-frequency driver 59 for driving the power amplifier 58.

The operation of the present invention will be described, referring to FIG. 2. When the circuit of FIG. 2 is supplied with a power supply, the controller 44 sends the control signal to the T/R switch 14 for setting it to be in a receiving mode. Hence, the vehicle mounted apparatus is in the receiving mode. The temperature compensated oscillator 24 in the frequency generator 31 generates the signal of the given frequency (fx), which is changed into the signal of the first frequency (64fx) by the first PLL 26, and the signal of the first frequency (64fx) is applied to both the first RF mixer 20 and the transmitting mixer 54.

In addition, the frequency divider 28 divides the output frequency (fx) of the temperature compensated oscillator 24 by nine, and the signal of the divided frequency (fx/9) is applied to both the PRN generator 46 and the second PLL 30 which converts the signal of the second frequency (fx/9) into a signal of the third frequency (32fx/9). The third frequency is provided with the PSK demodulator 50 as a carrier frequency. If the control center CC transmits over the antenna 12 the referencing signal which is frequency-modulated from the POCSAG coded address of the vehicle to be located, the antenna 12 delivers the referencing signal to the T/R switch 14 in the vehicle mounted apparatus. The signal amplified by the amplifier 16 is low-pass-filtered by the first RF band-pass-filter 18. The first RF mixer 20 mixes the output of the first RF band-pass-filter 18 with the signal of the first frequency (64fx) for producing the signal of the first intermediate frequency (1st-IF). The output of the first RF mixer 20 is RF band-pass-filtered by the second RF band-pass-filter 32 whose output is mixed with the signal of the local oscillator 36 by the second RF mixer 34. The output of the second RF mixer 34 is converted into the signal of the second intermediate frequency (2nd-IF) by means of the third RF band-pass-filter 38.

The FSK demodulator 40 encodes the received signal in the format of the POCSAG code by demodulating the output of the third RF band-pass-filter 38 in a way of FSK demodulation. The POCSAG code produced by the FSK demodulator 40 corresponds to the address code for locating the vehicle. The POCSAG decoder 42, after comparing the POCSAG coded address information of the FSK demodulator with the identifying address code, produces a flag signal only when the two address codes are equal to each other. If the flag signal is presented on the output terminal of the POCSAG decoder 42, the controller 44 produces the control signal (TRS) for setting the T/R switch 14 to be in transmitting mode, for enabling the vehicle mounted apparatus to generate an answer signal, and for enabling the power amplifier 58 to be operated.

The PRN generator 46 of the answer signal generator which is enabled by the control signal from the controller 44 which converts the signal of the second frequency from the frequency generator 31 into the PRN signal (fPRN). The power amplifier 58 amplifies the output of the transmitting signal generator 57 under the control of the controller 44. The output of the PRN generator 46 is low-pass-filtered by the low pass filter (LPF) 48 whose output is applied to the PSK modulator 50. The PSK modulator 50 modulates the output of the LPF 48 with the signal of the third frequency (32fx/9) of the second PLL 30 in the manner of phase shift keying modulation. With the fourth RF band-pass-filter 52, the output of the PSK modulator 50 is RF band-pass-filtered. The transmitting mixer 54 in the transmitting signal generator 57 mixes the output of the fourth RF band-pass-filter 52 with the signal of the first frequency (64fx) in order to output an up-converted signal.

The output of the transmitting mixer 54 is RF band-pass-filtered by the fifth RF-band-pass-filter 56 from which an output is applied to the RF driver 59 which drives the RF power amplifier 58. The RF power amplifier 58 is enabled by the control signal from the controller 44. The output of the RF power amplifier 58, the final transmitting signal informing the location of the vehicle to be located, is sent to the antenna 12 by way of the T/R switch 14. At this time, the temperature compensated oscillator 24 generates the signal of constant frequency regardless of temperature and time variations.

When the antenna 12 in the vehicle mounting apparatus transmits an answer signal over the site antennas $S_1$-$S_3$, the control center CC references the location of the vehicle by detecting and decoding the signal from the site antennas $S_1$-$S_3$ of the vehicle mounting apparatus. At this time, the duration of the answer signal is controlled by the controller 44. The output frequency from the RF power amplifier 58 in the vehicle location system must be determined in advance so that the relationship between the output frequency fT and the frequency of the pseudorandom noise signal (fPRN) from the PRN generator 46 can be as follows:

$$\frac{fT}{608} = fPRN$$

As described above, in the inventive vehicle location system which includes a control center, site antennas, and a vehicle mounted apparatus, a referencing signal meaning an identifying address code of a vehicle to be located is detected by the receiver of the vehicle mounted apparatus, which transmits an answer signal relating to the location of the vehicle to the control center. By this way, the control center can reference the location of the vehicle to be located.

While the invention has been particularly shown and described with reference to a preferred embodiment, it will be understood by those skilled in the art that modifications in detail may be made without departing from the spirit and scope of the invention.

What is claimed is:

1. In an automatic vehicle location system comprising a control center for transmitting a radio-frequency address signal of an identifying address of a vehicle to be located, and a vehicle mountable apparatus for receiving said radio-frequency address signal, and for transmitting an answer signal, said vehicle mountable apparatus comprising:
   a non-directional antenna;
   transmitting and receiving switch means for transmitting said answer signal to said antenna, and for receiving said radio frequency address signal having a received address code from an antenna;
   frequency generator means, having a temperature compensated oscillator for generating a signal of a given frequency, for generating a signal of a first frequency, a signal of a second frequency, and a signal of a third frequency in dependence upon said signal of a given frequency;
   first frequency converter means for performing a conversion of the radio frequency address signal into a signal of first intermediate frequency based upon said signal of said first frequency;
   second frequency converter means for converting said signal of said first intermediate frequency into a signal of a second intermediate frequency;
   frequency-shift keying demodulator means for encoding said received address code from said control center in a format of post office committee standard association group code by demodulating said signal of said second intermediate frequency by frequency shift keying modulation;
   POCSAG decoder means for producing a flag signal received only when said received address code encoded by said frequency shift keying demodulator means is equal to an identifying address code of said vehicle by comparing the received address code from the frequency shift keying demodulator means with the identifying address code of the vehicle;
   controller means for producing a control signal, said control signal being applied to said transmitting and receiving switch means for setting said transmitting and receiving switch means to be in a transmitting mode in response to said flag signal;
   answer signal generating means for generating said answer signal under control of said controller;
   transmitting signal generating means for generating a transmitting signal by modulating said answer signal with said signal of said first frequency by phase shift keying modulation; and
   power amplifier means, operably associated with the control signal of said controller, for amplifying said transmitting signal.

2. The vehicle system of claim 1, wherein said answer signal generating means of said vehicle mountable apparatus comprises:
   pseudo random raise nose signal generating means for converting said signal of said second frequency into a pseudo random noise signal under control of said controller means; and
   phase shift key modulator means for demodulating output of said pseudo random noise signal generating means with said signal of said third frequency by phase shift keying modulation.

3. The vehicle location system of claim 2, wherein said transmitting signal generating means comprises:
   transmitting mixer means for mixing output of said phase shift keying modulator means with said signal of said first intermediate frequency;
   radio frequency band pass filter means for band-pass-filtering output of said transmitting mixer means; and
   RF driver means for driving said power amplifier with output of said radio frequency band pass filter means.

4. An apparatus for mounting on a vehicle for use in an automatic vehicle system, the apparatus comprising:
   means for receiving from a remote control center radio frequency signals containing address codes;
   means for transmitting to said remote control center radio-frequency signals containing an answer signal;
   frequency generating means having a temperature compensated oscillator for generating a signal of a predetermined and fixed frequency, for respectively generating first, second and third frequency signals in dependence upon said signal of a predetermined and fixed frequency;
   means for detecting address codes from radio-frequency signals received by said receiving means, said detecting means comprising a first frequency converter for converting a received radio-frequency signal into a first intermediate frequency signal in dependence upon said first frequency signal, and a second frequency converter for converting said first intermediate frequency signal into a second intermediate frequency signal;

means for comparing address codes received from said detecting means with a predetermined code unique to the apparatus and for generating a comparison signal having a predetermined value when an address code corresponds to said predetermined code;

answer signal generating means for generating an answer signal when said comparison signal has said predetermined value, said answer signal generating means comprises means for generating a pseudo-random noise signal in dependence upon said second frequency signal, and a modulator for modulating said pseudo-random noise signal by means of phase-shift keying modulation in dependence upon said third frequency signal; and means for generating a transmission signal based upon said answer signal and for providing said transmission signal to be transmitted by said transmitting means when said comparison signal has said predetermined value.

5. An apparatus according to claim 4, wherein said pseudo-random noise signal generating means is controlled by a control means.

6. An apparatus according to claim 4, wherein said transmission signal generating means comprises:
   a mixer for mixing an output of said modulator with said first frequency signal;
   a radio frequency band-pass filter arranged to receive and filter an output of said mixer; and
   a radio-frequency driver connected to receive an output of said radio-frequency band-pass filter and to provide an output to a power amplifier.

7. An automatic vehicle location system, comprising:
   a stationary antenna;
   a control center arranged to transmit radio-frequency signals via said antenna containing address codes of vehicles to be located; and
   a plurality of vehicle-mounted apparatus each mounted on a respective vehicle and arranged to receive from said control center, said radio-frequency signals containing said address codes and to transmit to the control center radio-frequency signals containing an answer signal, said vehicle-mounted apparatus comprising:
   means for receiving from a remote control center radio frequency signals containing address codes;
   means for transmitting to said remote control center radio-frequency signals containing an answer signal;
   frequency generating means having a temperature compensated oscillator for generating a signal of a predetermined and fixed frequency, for respectively generating first, second and third frequency signals in dependence upon said signal of a predetermined and fixed frequency;
   means for detecting address codes from radio-frequency signals received by said receiving means, said detecting means comprising a first frequency converter for converting a received radio-frequency signal into a first intermediate frequency signal in dependence upon said first frequency signal, and a second frequency converter for converting said first intermediate frequency signal into a second intermediate frequency signal;

means for comparing address codes received from said detecting means with a predetermined code unique to the apparatus and for generating a comparison signal having a predetermined value when an address code corresponds to said predetermined code;

answer signal generating means for generating an answer signal when said comparison signal has said predetermined value, said answer signal generating means comprises means for generating a pseudo-random noise signal in dependence upon said second frequency signal, and a modulator for modulating said pseudo-random noise signal by means of phase-shift keying modulation in dependence upon said third frequency signal; and means for generating a transmission signal based upon said answer signal and for providing said transmission signal to be transmitted by said transmitting means when said comparison signal has said predetermined value.

8. An automatic vehicle location system according to claim 7, further comprises at least three radio transmitters at fixed mutually-spaced apart location, arranged to transmit signals and receive signal from said vehicle-mounted apparatus.

9. The apparatus according to claim 4, further comprising a non-directional antenna for receiving signals from and transmitting signals to a remote control center.

10. The apparatus according to claim 4, further comprising:
    a transmit/receive switch; and
    control means for receiving said comparison signal and for controlling the transmit/receive switch to be in one of a receive mode and a transmit mode, said control means controlling the transmit/receive switch to be in a transmit mode when said comparison signal has said predetermined value.

11. The apparatus according to claim 10, further comprising a power amplifier coupled to be controlled by said control means for amplifying said transmission signal.

12. The apparatus according to claim 4, wherein said detecting means further comprises means for demodulating said second intermediate frequency signal by means of frequency-shift keying demodulation.

13. The apparatus according to claim 12, wherein said detecting means further comprises means for demodulating said second intermediate frequency signals by means of frequency-shift keying demodulation.

14. The apparatus according to claim 13, wherein said comparing means is a Post Office Committee Standard Association Group format decoder for comparing address codes received from said detecting means with a predetermined code unique to the apparatus to generate a comparison signal having a predetermined value when an address code corresponds to said predetermined code.

15. The vehicle mounted apparatus in an automatic vehicle location system according to claim 7 further comprises:
    a non-directional antenna for receiving signals from and transmitting signals to a remote control center;
    a controller for receiving said comparison signal and for controlling the transmitter and receiver switch means to be in one of a receive mode and a transmit mode, said controller controlling the transmitter and receiver switch means to be in a transmit mode when said comparison signal has said predetermined value; an a power amplifier coupled to be controlled by said controller for amplifying said transmission signal.

16. The vehicle mounted apparatus in an automatic vehicle location system according to claim 7, wherein said address codes and said predetermined code are of Post Office Committee Standard Association Group format.

17. The vehicle mounted apparatus in an automatic vehicle location system according to claim 7, wherein said detecting means comprises a frequency-shift key demodulator for demodulating said second intermediate frequency signals by means of frequency-shift keying demodulation.

18. The vehicle mounted apparatus in an automatic vehicle location system according to claim 7, wherein said comparing means is a Post Office Committee Standard Association Group format decoder for comparing address codes received from said detector means with a predetermined code unique to the apparatus to generate a comparison signal having a predetermined value when an address code corresponds to said predetermined code.

19. The vehicle mounted apparatus in an automatic vehicle location system according to claim 7, wherein said generating means comprises:

a mixer for mixing an output of said modulator with said first frequency signal;

a radio frequency band-pass filter arranged to receive and filter an output of said mixer; and a radio-frequency driver connected to receive an output of said radio-frequency band-pass filter and to provide an output to a power amplifier.

* * * * *

UNITED STATES PATENT AND TRADEMARK OFFICE
CERTIFICATE OF CORRECTION

PATENT NO. : 5,142,281
DATED : August 25, 1992
INVENTOR(S) : Hyun-Chul Park

It is certified that error appears in the above-indentified patent and that said Letters Patent is hereby corrected as shown below:

Abstract:
        Line 3, change "a" (first occurrence) to --an--;

Figure 2:
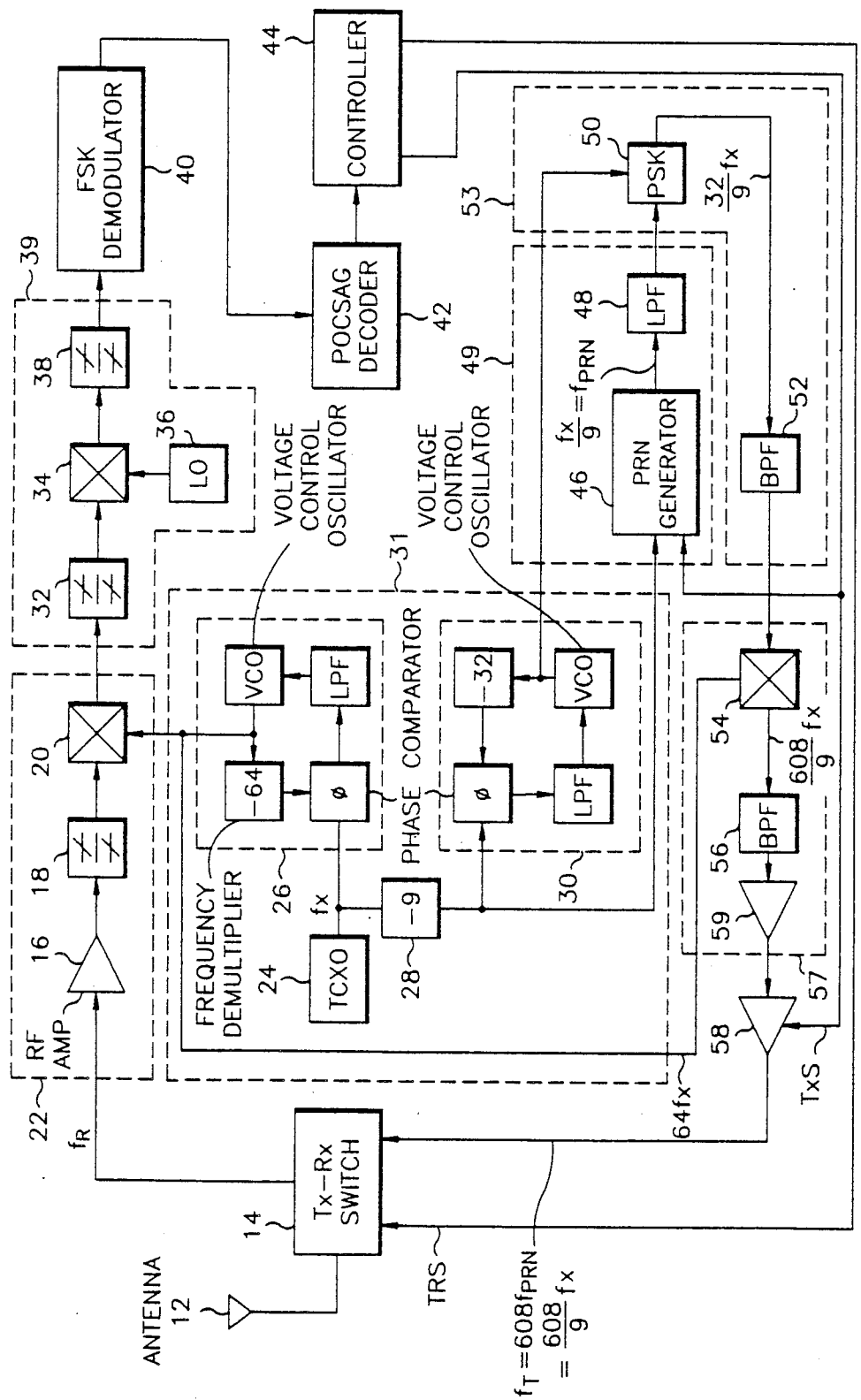

Line 6, change "committee" to --committee--; and,

Line 8, change "supplier" to --supply--.

Column 2, Line 29, delete the comma and extra space.

Claim 15, Column 9, Line 6, change "an" to --and--;

Claim 17, Column 9, Line 19, change "signals" to --signal--;and,

Claim 18, Column 10, Line 5, change "detector" to --detecting--.

Signed and Sealed this

Twenty-sixth Day of October, 1993

*Attest:*

BRUCE LEHMAN

*Attesting Officer*     *Commissioner of Patents and Trademarks*